(12) United States Patent
Godar

(10) Patent No.: US 9,781,379 B2
(45) Date of Patent: Oct. 3, 2017

(54) MEDIA RECORDING FOR AUDIO VISUAL ENTERTAINMENT

(75) Inventor: Anthony William Godar, London (GB)

(73) Assignee: Sony Interactive Entertainment Inc. (JP)

( * ) Notice: Subject to any disclaimer, the term of this patent is extended or adjusted under 35 U.S.C. 154(b) by 1038 days.

(21) Appl. No.: 12/990,100

(22) PCT Filed: Apr. 29, 2009

(86) PCT No.: PCT/GB2009/001083
§ 371 (c)(1),
(2), (4) Date: Aug. 2, 2011

(87) PCT Pub. No.: WO2009/133363
PCT Pub. Date: Nov. 5, 2009

(65) Prior Publication Data
US 2011/0274405 A1 Nov. 10, 2011

(30) Foreign Application Priority Data

May 1, 2008 (GB) .................................. 0808008.7

(51) Int. Cl.
*H04N 5/77* (2006.01)
*H04N 5/76* (2006.01)
(Continued)

(52) U.S. Cl.
CPC ......... *H04N 5/781* (2013.01); *H04N 1/32776* (2013.01); *H04N 5/77* (2013.01); *H04N 21/44218* (2013.01); *H04N 5/144* (2013.01)

(58) Field of Classification Search
USPC ........... 386/224, 230, 235, E5.003; 348/552; 348/143, 180, 601; 369/27.01; 382/190;
(Continued)

(56) References Cited

U.S. PATENT DOCUMENTS 7,800,693 B2 * 9/2010 Ishihara ................... H04N 5/44
348/552
2005/0229222 A1 10/2005 Relan et al.
(Continued)

FOREIGN PATENT DOCUMENTS

EP 1104189 A2 5/2001
EP 1374568 A2 1/2004
(Continued)

OTHER PUBLICATIONS

International Preliminary Report on Patentability, PCT/GB2009/001083, dated Apr. 29, 2009.
(Continued)

*Primary Examiner* — Thai Tran
*Assistant Examiner* — Syed Hasan
(74) *Attorney, Agent, or Firm* — Lerner, David, Littenberg, Krumholz & Mentlik, LLP

(57) ABSTRACT

A media recorder is operable to receive broadcast media data from a media data source. The media recorder comprises a storage element for storing at least a portion of the media data, and a receiver for receiving a sequence of video images from a video camera. The media recorder further comprises a user detector for detecting whether a user is attending to a presentation of the media data, and a media presentation status detector operable to detect whether the presentation of the media item has ended. If the user detector detects that the user is not attending to the presentation, the user detector is operable to cause the storage element to store the media data. If the media presentation status detector detects that presentation of the media item has ended, the media presentation status detector is operable to cause the media recorder to enter a stand-by mode.

15 Claims, 13 Drawing Sheets

(51) Int. Cl.
  *H04N 5/775* (2006.01)
  *H04N 7/00* (2011.01)
  *H04N 7/18* (2006.01)
  *H04N 5/781* (2006.01)
  *H04N 1/327* (2006.01)
  *H04N 21/442* (2011.01)
  *H04N 5/14* (2006.01)

(58) Field of Classification Search
  USPC .......................................................... 709/202
  See application file for complete search history.

(56) References Cited

U.S. PATENT DOCUMENTS

| | | | | |
|---|---|---|---|---|
| 2005/0281531 | A1* | 12/2005 | Unmehopa | H04N 5/76 386/230 |
| 2006/0158968 | A1* | 7/2006 | Vanman | G08G 1/054 369/27.01 |
| 2007/0150535 | A1* | 6/2007 | Kellner | G06K 9/00281 709/202 |
| 2009/0097754 | A1* | 4/2009 | Tsai | H04N 5/23219 382/190 |

FOREIGN PATENT DOCUMENTS

| | | |
|---|---|---|
| EP | 1825674 A1 | 8/2007 |
| EP | 1843591 A1 | 10/2007 |
| JP | 4-259174 A | 9/1992 |
| JP | 11-215460 A | 8/1999 |

OTHER PUBLICATIONS

International Search Report and Written Opinion, PCT/GB2009/001083, dated Jul. 28, 2009.

Search Report from GB Application No. 0808008.7, dated Aug. 28, 2008.

Examination Report from GB Application No. 0808008.7, dated Mar. 5, 2010.

* cited by examiner

MEDIA RECORDING FOR AUDIO VISUAL ENTERTAINMENT

CROSS REFERENCE TO RELATED APPLICATIONS

The present application is a national phase entry under 35 U.S.C. §371 of International Application No. PCT/GB2009/001083 filed Apr. 29, 2009, published in English, which claims the benefit of and priority to GB Patent Application No. 0808008.7, filed May 1, 2008, the entire disclosures of which are hereby incorporated by reference herein.

The present invention relates to a media recorder and an audio visual entertainment system and method.

Since their conception, video recorders such as video cassette recorders (VCRs) for recording television programmes have become increasingly popular. Recently, with the advent of digital television devices and increases in storage capacity of hard disc drives, it has become possible to record television programmes to a hard disc drive rather than to a magnetic tape. Hard disc drive television recorders are commonly called personal video recorders (PVRs) or digital video recorders (DVRs). These have the advantage that many programmes can be stored on one disc drive and programme data related to the broadcast of a television programme can be used to generate control signals that cause the PVR the record a particular programme at the same time each day without the need for a user to program a complicated timer as was sometimes the case for VCRs.

When a user is watching a television programme, they are unlikely to be recording the television programme at the same time. However, if the user is interrupted whilst watching a television programme, for example by having to get up and leave the room to answer a telephone call or go to a front door, in order to avoid missing part of the television programme, the user could use a remote control to trigger the PVR to record the programme. However, in so doing, the user may fumble with the remote control and accidentally record the wrong programme or not trigger the PVR to start recording. Similarly, for example, if the user wishes to make a drink or the like, the user may miss an exciting part of a sports game they were watching such as the scoring of a goal during a football match. Although a manual pause function on the television would allow a user to pause a television programme and store subsequent content to a storage means so that they could continue viewing the programme on their return, the user is unlikely to use such a function if they are intending to be absent from the room for only a short length of time. Additionally, if a user falls asleep whilst watching a television programme, they are likely to miss the content of the television programme and be unable to trigger the PVR to record the programme.

A similar problem may occur when the user is watching content that has already been recorded on the PVR or content stored on a storage medium such as Digital Versatile Disc (DVD) or high definition Blu-ray® disc on a suitable media player (media reproducing device). If a user wishes to briefly leave the room or their viewing is interrupted, for example by a door bell going, the user may miss some of the playback of the recorded content. Accordingly, when the user returns to view the content, they may have to use the remote control to rewind the recorded content manually to a point at which they were interrupted. This can be time consuming and annoying to the user.

The present invention seeks to alleviate or mitigate the above problems.

In a first aspect, there is provided a media recorder operable to receive broadcast media data from a media data source, the media recorder comprising: a storage element operable to store at least a portion of the broadcast media data received from the media data source; a receiver operable to receive a sequence of video images from a video camera via a communications link; a user detector operable to detect, by analysis of the sequence of video images received from the video camera via the communications link, whether a user is attending to a presentation of the media data by a media data presentation unit; and a media presentation status detector operable to detect whether the presentation of the media item has ended, in which: if the user detector detects that the user is not attending to the presentation of the media data, the user detector is operable to cause the storage means to store the media data received from the media data source; and if the media presentation status detector detects that presentation of the media item has ended, the media presentation status detector is operable to cause the media recorder to enter a stand-by mode.

In a second aspect, there is provided a method for storing broadcast media data received from a media data source using a media recorder operable to receive the broadcast media data from the media data source and having a storage element operable to store at least a portion of the broadcast media data received from the media data source, the method comprising: receiving a sequence of video images from a video camera via a communications link; detecting, by analysis of the sequence of video images received from the video camera via the communications link, whether a user is attending to a presentation of the media data by a media data output source; storing the media data received from the media data source to the storage means if the detection of whether the user is attending to the presentation of the media data detects that the user is not attending to the presentation of the media data; detecting whether the presentation of the media item has ended; and causing the media recorder to enter a stand-by mode if it is detected that presentation of the media item has ended.

By analysing a sequence of images captured by a video camera, embodiments of the invention can detect whether a user is attending to presentation of broadcast media data such as a television programme. For example, the user may not be attending to the presentation of the television programme if they have left the room for whatever reason or if they have fallen asleep. Accordingly, embodiments of the present invention allow data relating to the broadcast media data to be stored to a storage medium if the user is not attending to the presentation of the media data. This advantageously allows the user to view the media data at a later time so that even if the user was not attending to the broadcast media data (e.g. they were asleep or had left the room to make a drink) and accidentally missed an exciting event within the broadcast media data, they can still view the exciting event even though the user was not attending to the broadcast media data when the exciting event happened.

Further respective aspects and features of the invention are defined in the appended claims.

Embodiments of the present invention will now be described by way of example with reference to the accompanying drawings, in which.

A media recorder, audio visual entertainment system and method disclosed. In the following description, a number of specific details are presented in order to provide a thorough understanding of embodiments of the present invention. It will be apparent, however, to a person skilled in the art that these specific details need not be employed to practise the present invention. Conversely, specific details known to the person skilled in the art are omitted for the purposes of clarity in presenting the embodiments.

Referring now to FIGS. 1 to 4, in an embodiment of the present invention the audio visual entertainment system comprises a Sony® Playstation 3® entertainment device coupled to a dual digital TV tuner.

Figure 1:
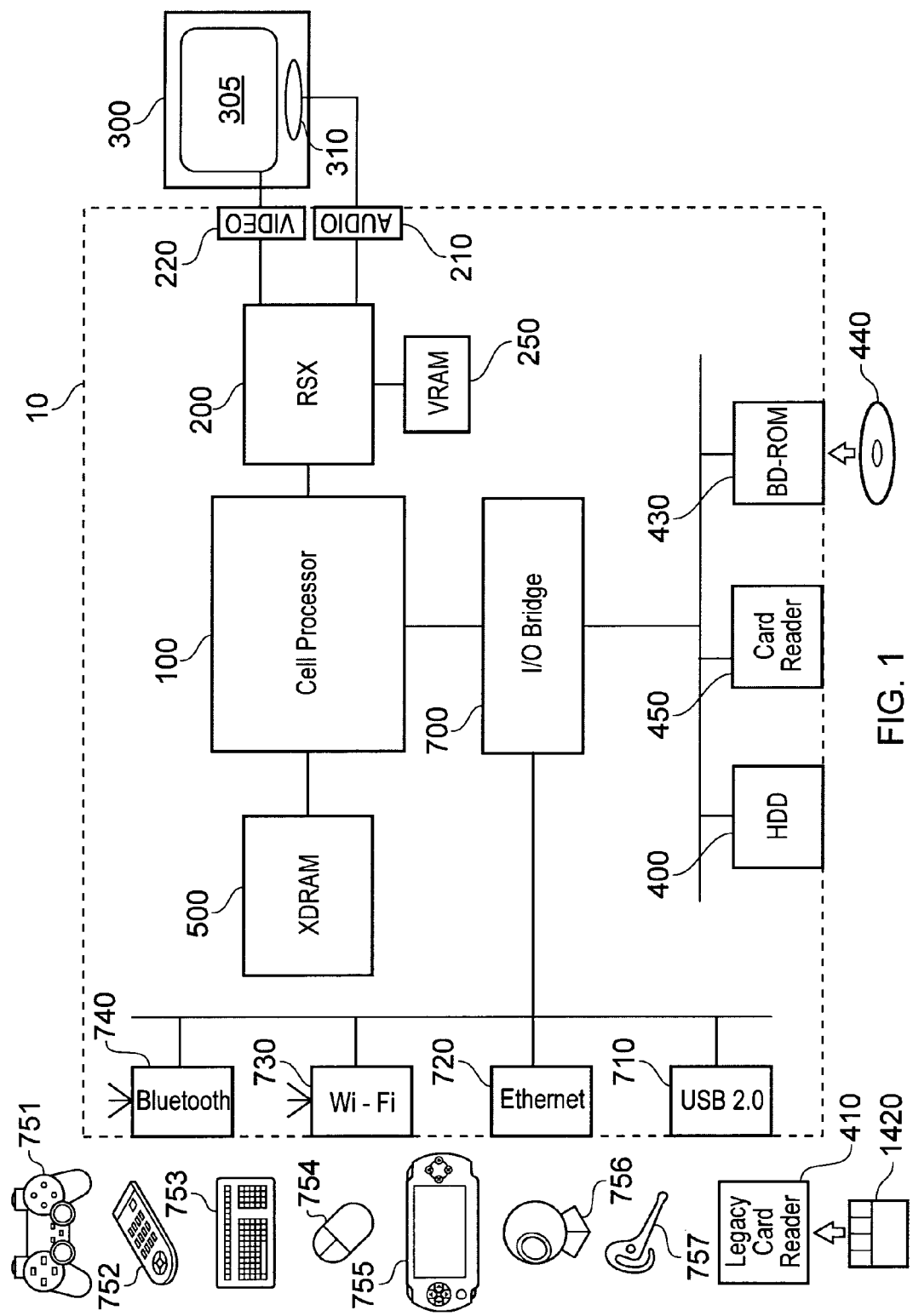
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may to communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
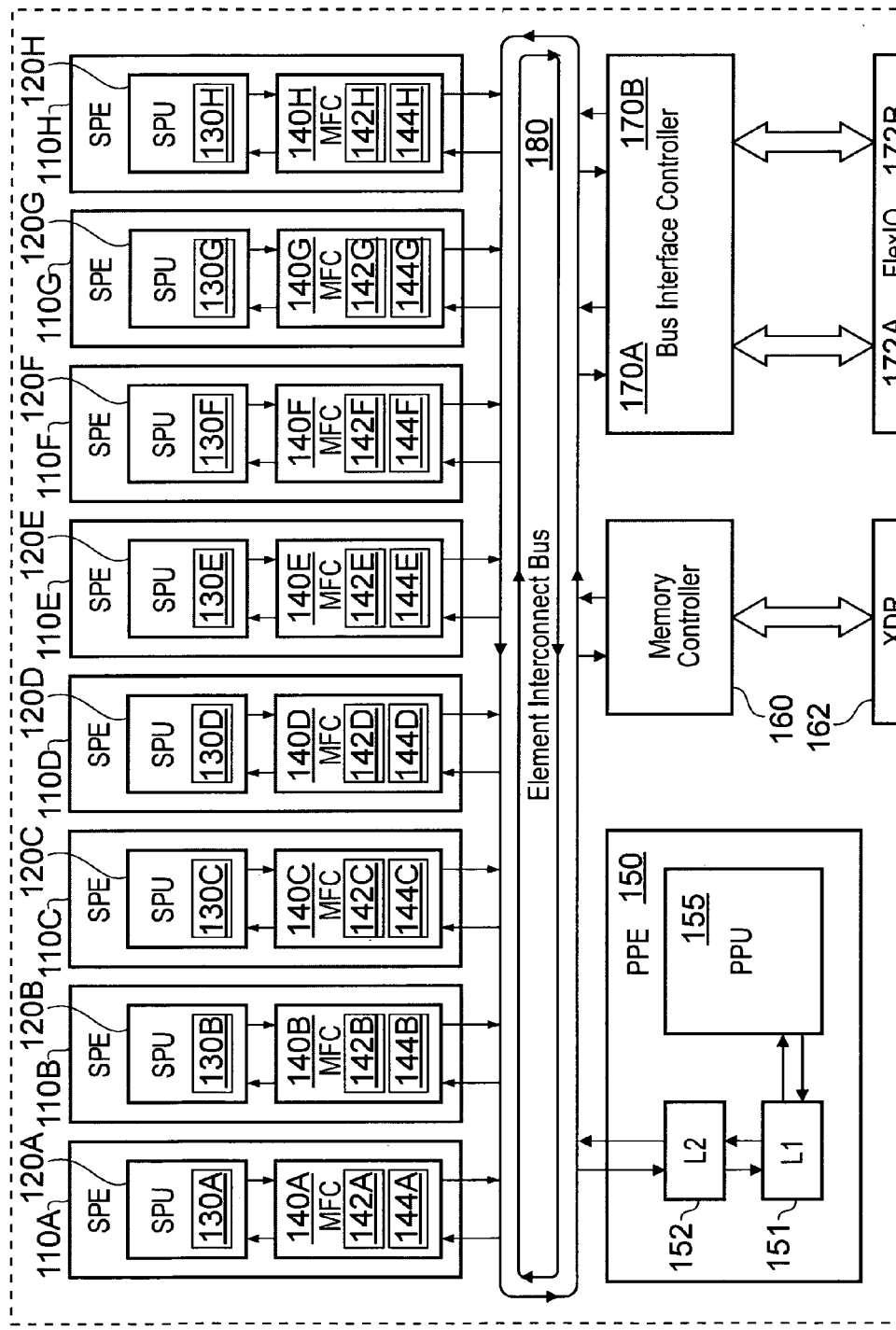
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload.

In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
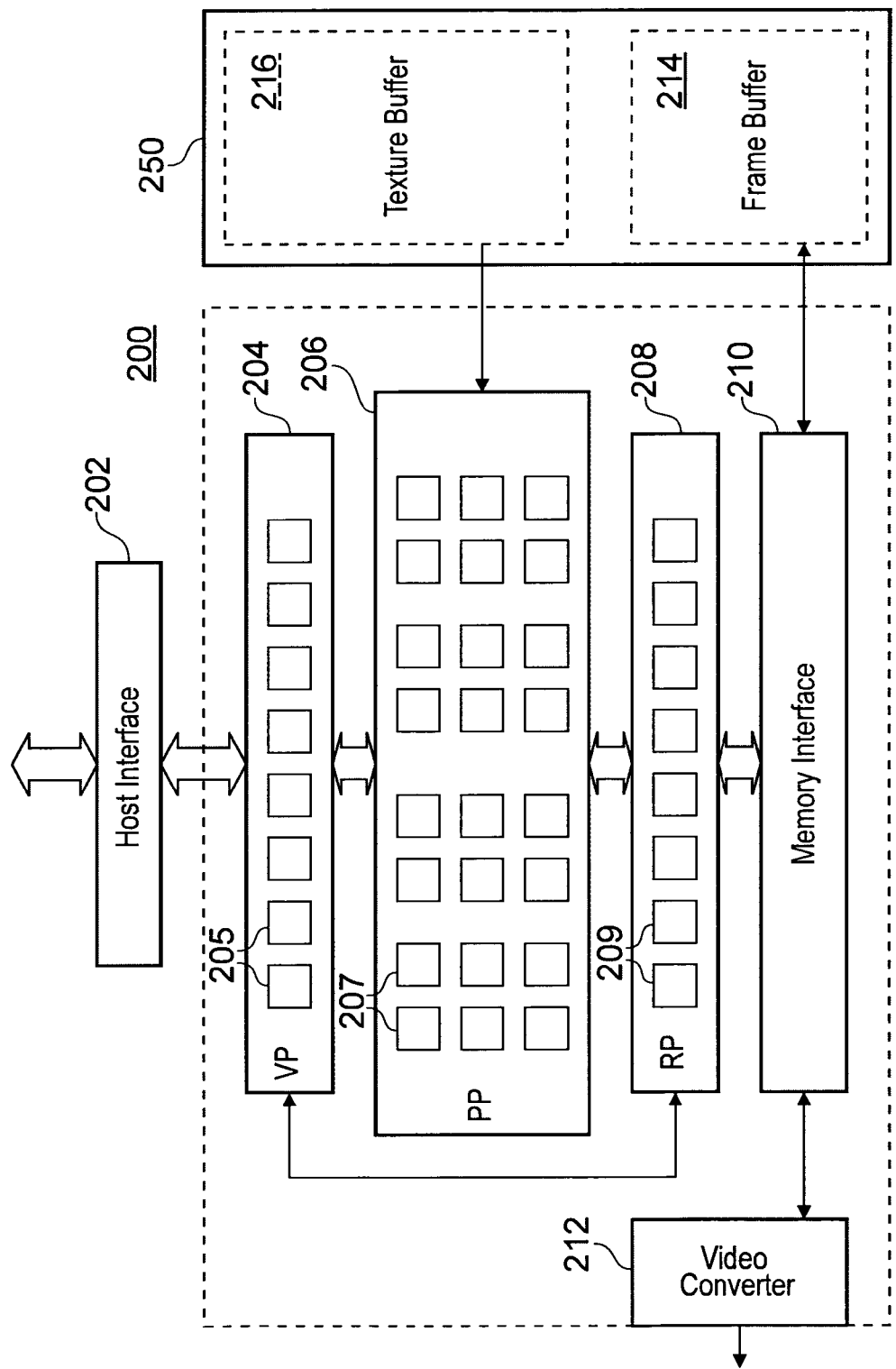
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP)

comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the to firmware and OS of the Playstation 3 device itself. It will be appreciated that the term "on-line" does not imply the physical presence of wires, as the term can also apply to wireless connections of various types.

Figure 4:
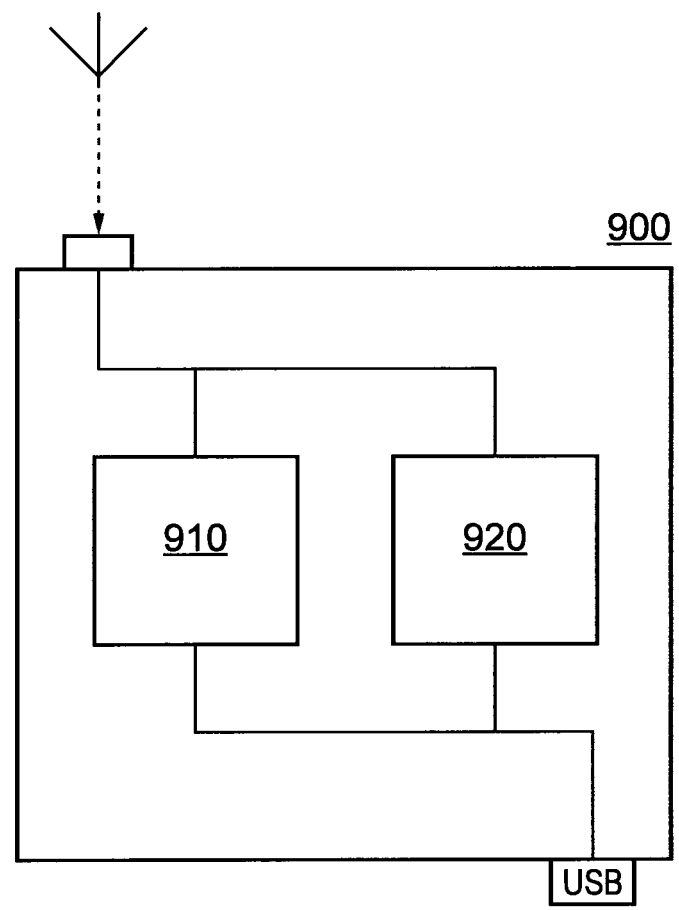
FIG. 4 is a schematic diagram of a dual TV receiver in accordance with an embodiment of the present invention.

Referring now to FIG. 4, a dual digital TV tuner 900 comprises a first tuner 910 and a second tuner 920 each operably coupled to an aerial, cable or satellite input. Each tuner can independently tune in to digital TV and radio channels available via the input signal, and output a respective audio-video data stream. A USB link to a USB port 710 of the PS3 10 provides control of the tuners, and routes the output of the tuners to the PS3 10. The PS3 processes any required non-AV data (such as electronic programme guides, teletext, or parental control data), and routes the AV data to the Reality Simulator graphics unit 200 for output to a display.

In an embodiment of the present invention, the PS3 10 uses its internal HDD 400 to record programmes. Optionally, the PS3 10 automatically records the currently displayed output in a circular buffer, so that if a user decides that they wanted to record a programme after already having watched half of it, then the first half is already cached and so a complete copy of the programme can be stored by completing the recording of the programme and storing it in a conventional manner. The circular buffer comprises continuous or discontinuous blocks of hard disk space as available, and the size of the buffer can be user define in terms of GBytes or hours recording, subject to available HDD space. It will be appreciated that an external hard disk, for example connected via USB, may also be used to store recorded programmes. For high-definition broadcasts, a comparatively larger circular buffer is preferable.

When used in combination, the tuner 900 and PS3 10 thus typically operate as a PVR. It will be appreciated, however, that other embodiments of the present invention may be built as a single bespoke unit in which case such a device would superficially resemble a so-called 'Freeview™' set-top box, or a cable or satellite set-top box. Moreover, other forms of data storage such as RAM could be used to record programmes.

Figure 5:
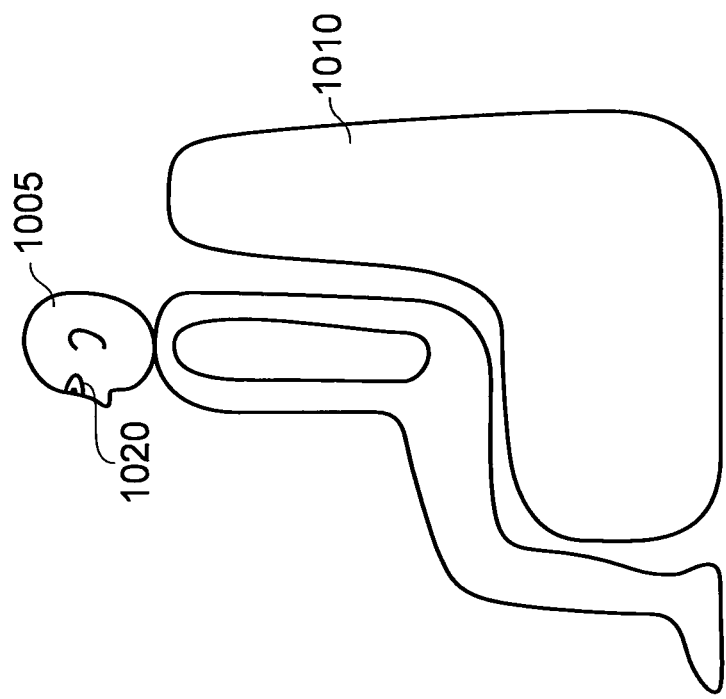
FIG. 5 is a schematic illustration in which a user is situated in front of an audio visual entertainment system in accordance with an embodiment of the present invention.
Figure 5:
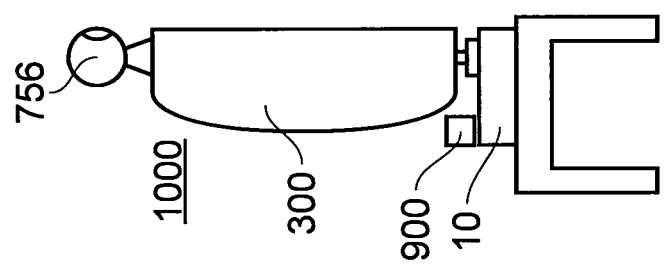

An embodiment of the present invention will now be described with reference to FIGS. 5 to 7. FIG. 5 shows a user 1005 who is watching a television programme using an audio visual entertainment system 1000 whilst sitting in a chair 1010. The user's eyes 1020 are also shown in FIG. 5.

The audio visual entertainment system 1000 comprises the system unit 10, the display and sound output device 300, the dual digital TV tuner 900, and the video camera 756. These cooperate together as described above so as to allow the user to watch the television programme. It will be appreciated that the audio visual entertainment system need not comprise the dual digital TV tuner 900 and that an dual analogue TV tuner or a single analogue or digital TV tuner could be used to receive the television programmes. Additionally, it will be appreciated that the audio visual entertainment system need not be limited to the one illustrated with respect to FIG. 5 and may comprise other components common to audio visual entertainment systems such as a surround sound amplifier and associated loud speakers.

In an embodiment of the present invention, the video camera 756 captures and transmits video images of the user 1005 via a suitable cable or wireless link to the system unit 10 so that the system unit 10 receives the video images at one of the USB ports 710. The processor 100 then processes the received video images using known techniques to extract image features that correspond to the user's facial expression such as smiling or frowning. The extracted image features are then used to generate popularity data, which is a representation of how the user is feeling about the programme that they are watching. For example, if the user is smiling, they are likely to be enjoying the programme. The popularity data may then be relayed to the programme provider via a suitable connection such as the internet so that the programme provider may assess how popular their programmes are so as to assist in the future planning and commissioning of programmes. Optionally, the user 1005 may select not to send the popularity data to the programme provider or, in the case where the television channel is a subscription channel requiring a fee to be paid in order to watch the channel, the user 1005 may be provided with a reduced subscription charge for that channel if they allow the programme provider to use the popularity data generated by the processor 100 from their facial expression.

Figure 6:
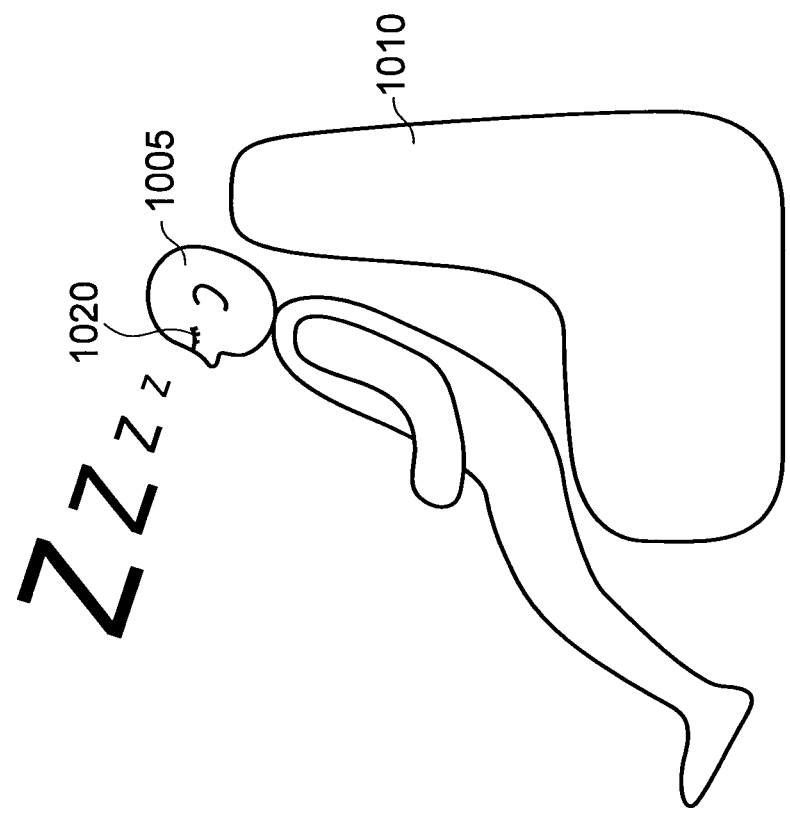
FIG. 6 is a schematic illustration of in which a user is sleeping in front of an audio visual, entertainment system in accordance with an embodiment of the present invention.
Figure 6:
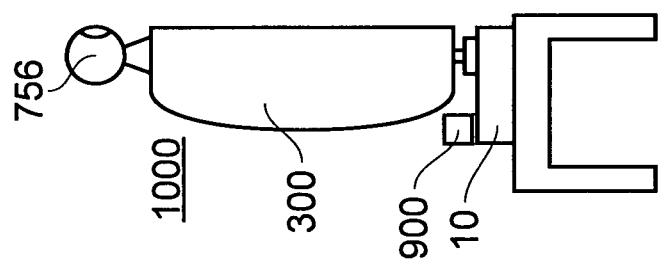
Figure 7:
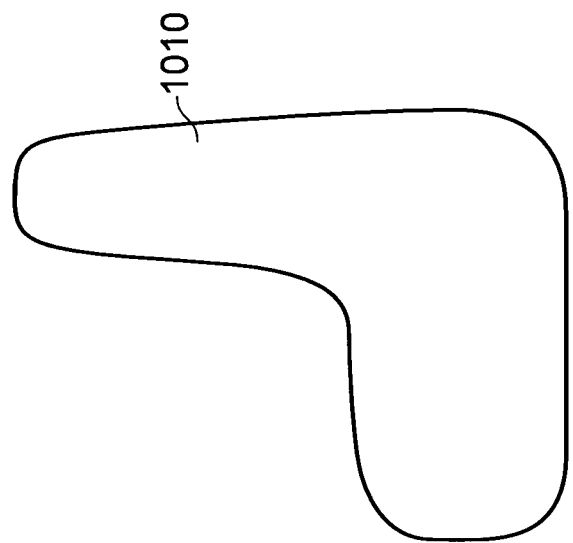
FIG. 7 is a schematic illustration in which a user is not present in front of an audio visual entertainment system in accordance with an embodiment of the present invention.
Figure 7:
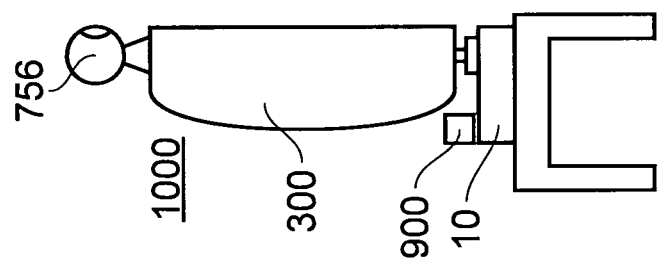

As shown in FIG. 6, whilst watching the television programme, the user 1005 may unwittingly fall asleep. Alternatively, the user may leave the room temporarily as illustrated by the user's absence in FIG. 7. During the time in which the user is asleep in front of the audio visual entertainment system 1000 or absent from the room in which the audio visual entertainment system 1000 is situated, the user 1005 is not aware of what is taking place in the television programme and may thus miss a crucial part of the programme such as an important plot twist in a costume drama or the scoring of a goal during a football game. In other words, when a user is asleep or has left the room, they are not attending to the television programme and so may miss what is taking place in the TV programme during the time in which they are not attending to the programme.

In order to address this problem and to allow the user 1005 to view content that they may have missed, the system unit is operable to detect whether the user 1005 is attending to the programme (e.g. whether they have fallen asleep or have left the room) by monitoring and analysing the video images generated by the video camera 756. If the system unit 10 detects that the user 1005 is asleep or no longer in front of the audio visual entertainment system, the system unit 10 starts recording the television programme that the user 1005 was watching onto the HDD 400. However, is will be appreciated that other forms of local storage such as an external hard drive operably connected to the system unit 10 via one of the USB ports 710 or a suitable memory card inserted into the card reader 450 or the legacy card reader 410 could be used to store the content of the television programme.

The way in which this functionality is achieved will now be described with reference to FIGS. 8 and 9.

Figure 8:
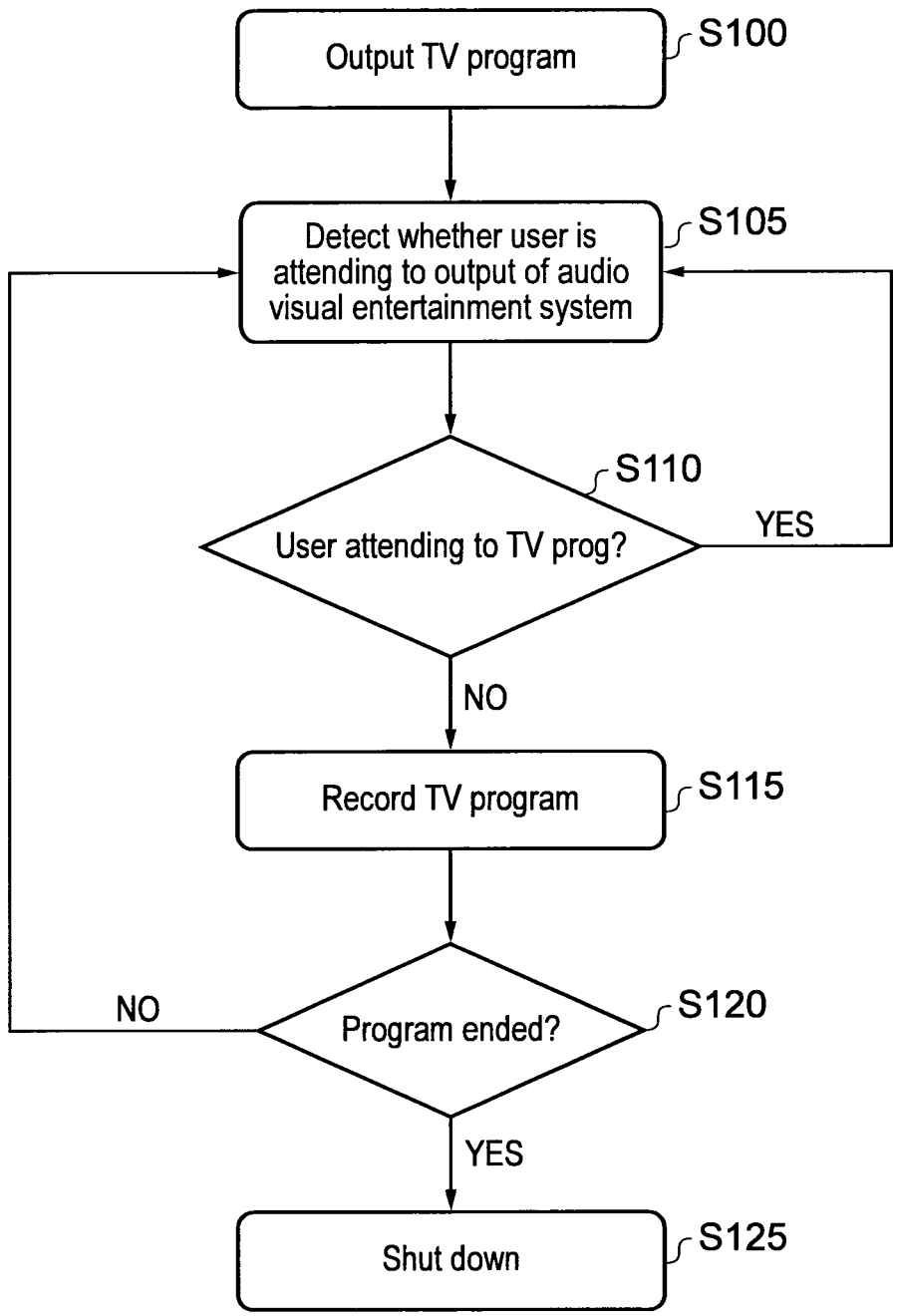
FIG. 8 is a flow diagram of a method, in accordance with an embodiment of the present invention, of recording television programmes using an audio visual entertainment system.

FIG. 8 is a flow diagram of a method of recording television programmes using the audio visual entertainment system 1000 in accordance with an embodiment of the present invention.

At a step s100, the audio visual entertainment system 1000 outputs a TV programme so as to present the TV programme to the user 1005. Then, at a step s105, the audio visual entertainment system 1000 detects whether the user 1005 is attending to the output of the audio visual entertainment system 1000. i.e. whether they are attending to the presentation of the TV programme. The system unit 10 receives a sequence of video images from the video camera 756 via a communications link such as the USB ports 710. The cell processor 100 then analyses the sequence of video images received from the video camera to detect whether the user 1005 is attending to the presentation of the TV programme. The way in which the audio visual entertainment system detects whether a user is attending to the presentation of the TV programme will be described in more detail later with reference to FIG. 9.

At a step s110, the cell processor 100 detects whether a user is attending to the presentation of the TV programme. If the user 1005 is attending to the presentation of the TV programme, then processing returns to the step s105.

However, if the user 1005 is not attending to the TV programme, (e.g. if they have fallen asleep or have left the room), then, at a step s115, the cell processor 100 causes the HDD 400 to store data relating to the TV programme so that a user can replay the TV programme at a later time. The way in which the TV programme is recorded will be described in more detail later with reference to FIG. 9.

Then, at a step s120, the system unit 10, detects whether the programme that the user 1005 was watching has ended. Typically, the system unit 10 achieves this functionality by detecting programme start and end broadcast data that is transmitted by a broadcast media provider together with data relating to audio and visual content of the TV programme. However, it will be appreciated that other suitable techniques may be used.

If the programme has not ended, then processing returns to the step s105. However, if the programme has ended, then at step s125, the cell processor 100 is operable cause the audio visual entertainment system 1000 to shut down or enter a stand-by mode. This reduces energy usage as well as, for example, reducing a likelihood that a user may wake and be startled by the content of a different TV programme from the one they were watching when they fell asleep.

In an embodiment, if the program has ended, the cell processor 100 is operable to cause the display and sound output device 300 to display a suitable graphical user interface asking the user whether they wish to continue viewing. The user may then select whether they wish to continue viewing using the game controller 751, remote control 752, or other suitable input or control device. If there is no input from the input device after a predetermined period of time, then the cell processor 100 causes the audio visual entertainment system 1000 to shut down or enter a stand-by mode at the step s125.

The method used to detect whether a user is attending to a TV programme will now be described in more detail with reference to FIG. 9.

Figure 9:
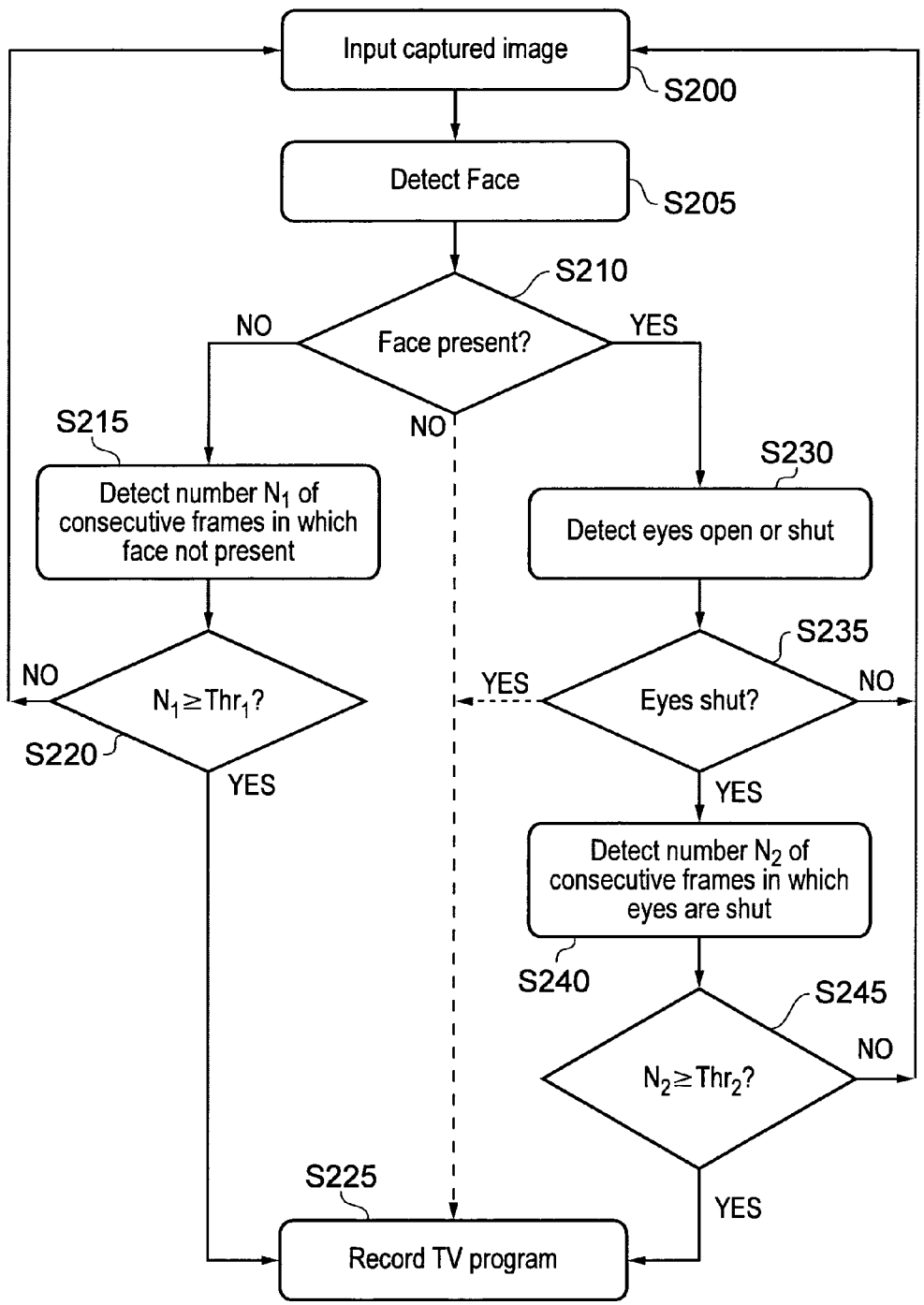
FIG. 9 is a flow diagram of a method, in accordance with an embodiment of the present invention, of detecting whether a television programme should be recorded by an audio visual entertainment system.

FIG. 9 is a flow diagram of a method of detecting whether a television programme should be recorded by the audio visual entertainment system.

At a step s200, an image from a sequence of video images captured by the video camera 756 is input to the system unit 10 via one of the USB ports 710. Then, at a step s205, the cell processor 100 carries out face recognition on the captured image using known face detection techniques. Optionally, the face detection is not carried out on the whole image. In an embodiment, face detection is carried out on a part of the image that is most likely to correspond to a position of the user's head, for example the centre of the image if the video camera 756 points directly at the user 1005. Alternatively, face detection is carried out on a previously defined image area which has been defined by the user via a suitable input device such as the game controller 751 or mouse 754 as corresponding to a location of their comfortable chair 1010 or other location from which they are likely to view the display and sound output device 300. However, it will be appreciated that other methods of selecting an image region in which to carry out face detection may be used.

At a step s210, the cell processor 100 determines whether a face is present in the captured image based on the result of the face detection carried out at the step s205. If no face is detected, then it is likely that the user 1005 is not attending to the programme. In other words, if the cell processor does not detect a face, the user 1005 may have left the room in which the audio visual entertainment system 1000 is situated or the user may be facing away from the audio visual entertainment system 1000 and be unable to see the display of the display and sound output device 300. Accordingly, it is unlikely that the are attending to the presentation of the programme.

In an embodiment of the present invention, if, at the step S210, the cell processor 100 detects that a face is not present, processing passes directly to a step s225, in which the TV programme is recorded to the HDD 400, as shown by the dashed line in FIG. 9. However, a likelihood that recording will be started when the user 1005 is still present in the room and intending to attend to the TV programme is increased. For example, a face might not be detected if the user 1005 temporarily turns their head away from the camera 756 to see who has entered the room. In this case, the user 1005 is likely to be still attending to the TV programme even though they have looked away temporarily from the display and sound output device 300. Therefore, the TV programme may be recorded unnecessarily.

To address this problem, in an embodiment of the present invention, if a face is not detected then, at a step s215, the cell processor 100 is operable to detect a number $N_1$ of consecutive image frames of the TV programme for which a face has not been present. Then, at a step s220, the number $N_1$ is then compared to a threshold $Thr_1$ to determine whether the programme should be recorded. This reduces the likelihood that recording will be initiated when a user is in the room and intending to attend to the TV programme or if a captured image is incorrectly detected at the steps 205 and 210 as not comprising a face.

To achieve this functionality, the cell processor 100 tags each image frame of the TV programme with data relating to whether a user was attending to the image frame. Once a captured image frame has been detected as not comprising a face, the cell processor 100 causes the XDRAM 500 to store a running total of the number of individual TV image frames for which a user is not attending to the programme so as to generate the number $N_1$.

Alternatively, the cell processor 100 is operable to generate the number $N_1$ by calculating a rolling average of the number of frames for which a user is not attending to the TV programme over a predetermined sample range. For example, the rolling average could be calculated over the previous 25 frames (for example over a time period of a second if the PAL television standard is used) although it will be appreciated that any other suitable sample size could be used.

Then, at a step s220, the cell processor detects whether the number $N_1$ is greater than a predetermined threshold $Thr_1$. The threshold $Thr_1$ can be selected by the user via a suitable graphical user interface (GUI) or may be preset within firmware of the system unit 10. However, it will be appreciated that any other suitable method of selecting $Thr_1$ could be used.

If the number $N_1$ is not greater than or equal to the threshold $Thr_1$, then it is likely that a user is still attending to presentation of the TV programme and therefore there is no need to record the TV programme. In this case, the process returns to the step s200.

However, if the number $N_1$ is greater than, or equal to, the threshold $Thr_1$ then it is likely that the user 1005 is not attending to the TV programme. Therefore, at a step s225, the system unit 10 causes data relating to the TV programme to be recorded to the HDD 400.

Returning now to the step s210, although a user may be in the field of view of the camera 756 (i.e. a face is likely to be detected at the step s210), the user 1005 might not be attending to the presentation of the TV programme because, for example, they might have fallen asleep. Therefore, if there is a face present in the captured image as detected at the step s210, processing passes to a step s230 in which the cell processor 100 detects whether the user's eyes 1020 are open or shut. In other words, the step s230 is used to detect whether the user 1005 is asleep, awake or in some other position in which they cannot see the display and sound output device 300. Typically, whether the user's eyes 1020 are open or shut is detected using known techniques such as colour matching or template matching although it will be appreciated that any other suitable technique could be used.

Then, at a step s235, if the user's eyes 1020 are not shut, processing returns to the step s200 in which an image from the sequence of video images captured by the video camera 756 is input to the system unit 10.

In an embodiment of the present invention, if the user's eyes are shut, then the cell processor 100 causes the HDD 400 start recording the TV programme at the step s225 as indicated by the dashed line in FIG. 9. However, if the frame rate of the video camera 756 is relatively high with respect to a blink rate of the user 1005, it is probable that one or more captured images will correspond to a situation in which the user is blinking and, correspondingly, the user's eyes 1020 are likely to be detected as being shut. This may lead to recording being triggered even if the user 1005 is merely blinking. Therefore, the processing preferably passes to the step s240 in which the cell processor 100 is operable to detect a number $N_2$ of consecutive frames during which the user's eyes 1020 are detected as being shut. The number $N_2$ is generated is a similar way to that described above with respect to the step s215 for generating the number $N_1$.

Then, at a step s245, the number $N_2$ is compared to a predetermined threshold $Thr_2$. The threshold $Thr_2$ can be selected by the user via a suitable graphical user interface (GUI) or may be preset within firmware of the system unit 10. However, it will be appreciated that any other suitable method of selecting $Thr_2$ could be used. The threshold $Thr_2$ may be the same as, or different to, $Thr_1$. Typically, if the threshold $Thr_2$ is preset within the firmware of the system unit 10, the threshold $Thr_2$ is set so as to correspond to a time period t that is longer than an average duration of a blink of an eye. So as to avoid recording being triggered unnecessarily, the threshold $Thr_2$ is typically set to be of the order of a few seconds according to the equation the threshold $Thr_2 = t \times FR$, where t is the time period in seconds, and FR is a frame rate of the video camera 756 in frames per second.

If the number $N_2$ is not greater than, or equal to, the threshold $Thr_2$, then processing returns to the step s200 because it is likely that the user 1005 is still attending to the TV programme. In other words, the user 1005 is probably blinking or yawning for example.

However, if the number $N_2$ is greater than or equal to the threshold $Thr_2$, then it is likely that the user 1005 has, for example, fallen asleep because their eyes 1020 have been shut for more than a few seconds. In this case, the cell processor 100 triggers the HDD 400 to start recording the TV programme at the step s225.

In an embodiment of the invention, instead of initiating recording after the steps s220 or s245, the TV programme is continuously stored to a circular buffer within the XDRAM 500 or a storage area of the HDD 400 that acts as a circular buffer. Then, when recording is triggered at the step s225, TV programme data relating to, for example, 5 minutes before the recording was triggered is moved from the circular buffer to a permanent storage area on the HDD 400. However, it will be appreciated that TV programme data can be moved to permanent storage corresponding to other periods of time.

Alternatively, in an embodiment, the circular buffer may be dynamically defined. In this case, the TV programme is continuously stored to the circular buffer. However, when recording is triggered at the step s225, a part of the buffer corresponding to the data to be recorded is re-designated as permanent storage. Other areas of the XDRAM 500 or HDD 400 are then designated as part of the circular buffer for future use.

In the above, "permanent storage" is taken to mean storage to data areas that are not overwritten as part of the circular buffer so that the user 1005 can play back content of the data areas at a later time. It does not imply that the data can never be deleted.

Alternatively, the duration of the time period before the recording is triggered may be set so as to correspond to the time period t used to calculate the threshold $Thr_2$ or a time period that corresponds to the number of frames $N_1$ needed to equal or exceed the threshold $Thr_1$. This prevents TV programme data that occurs between a first detection of the user not attending to the presentation to the TV programme and the actual initiation of recording at the step s225 being lost.

Once the TV programme data has been moved from the buffer to permanent storage, the recording of the TV programme then continues. Recording data from before the point at which the user stopped attending to the presentation of the TV programme allows the user 1005 to remind themselves of the content of the TV programme from just before they stopped attending e.g. when they fell asleep or left the room.

In an embodiment of the present invention, the cell processor is operable to detect where commercial breaks occur within the broadcast television content. Typically, commercial breaks comprise a series of commercials which are separated by a few blank frames which give rise to a corresponding reduction in volume. Accordingly, the cell processor is operable to analyse the broadcast TV content for the presence of commercials or adverts by monitoring the content of the broadcast TV data stream. When a series of blank frames accompanied by a reduction in volume occurs, the cell processor 100 creates a bookmark indicating that point. The cell processor 100 then uses the resultant data to generate control signals that cause the HDD 400 to not record the commercials. However, it will be appreciated that any other suitable technique for detecting the presence of commercials could be used.

In an embodiment of the present invention, once the audio visual entertainment system 1000 has detected that the user 1005 is not attending to the presentation of the TV programme, the audio visual entertainment system 1000 is operable to detect whether the user has returned to the presentation of the TV programme. For example, the system 1000 can detect whether the user 1005 has woken up or re-entered the room. The detection of whether the user 1005 is re-attending to the presentation of the TV programme is carried out in a similar way to that described with reference to FIG. 9 above, although it will be appreciated that other suitable methods could be used. In one example, the cell processor 100 is operable to analyse the captured video images received from the video camera 756 so as to detect the presence of a face or whether a user's eyes are open or shut as described above.

In an embodiment, once the audio visual entertainment system 1000 detects that the user 1005 has returned to the TV programme, the cell processor 100 is operable to automatically reproduce the TV programme data that was stored to the HDD 400 when the user stopped attending to the presentation of the TV programme.

For example, if the user 1005 had fallen asleep and then woken up at a later time, the cell processor detects that the user's eyes 1020 are open and initiates reproduction of the stored TV programme. Alternatively, for example, if the user 1005 had left the room and then returned at a later time, the cell processor 100 detects that there is a face within the field of view of the video camera 756 and initiates reproduction of the TV programme. Optionally, the cell processor is operable to detect whether the user 1005 that has returned to the room is the same user that was previously attending to the TV programme using known face recognition techniques and template and pattern matching techniques. This advantageously reduces the likelihood that a recorded TV programme will be presented to a user who was not initially attending to the programme.

In an alternative embodiment, instead of automatically initiating reproduction of stored TV programme data when a user has returned to the presentation of the TV programme, the cell processor 100 is operable to generate a options menu that is displayed to the user 1005 on the sound and display output device 300 which allows the user to select whether they wish to view the recorded TV programme data.

So as to reduce the amount of data that is recorded, in an embodiment of the present invention, the cell processor 100 is operable to send control signals to the HDD 400 so that TV programme data is not recorded if the user 1005 starts re-attending to the presentation of the TV programme. In an embodiment, the cell processor 100 is operable to send control signals to the HDD 400 so as to cause the HDD 400 to stop storing the TV programme data if the user has been re-attending to the presentation of the TV programme for greater than a predetermined threshold number of video images received from the video camera.

However, if the user 1005 starts re-attending to the TV programme before the broadcast of the TV programme has finished, the user may miss the end of the programme if the TV programme is not recorded once the user 1005 starts re-attending. Therefore, in an embodiment, when the user 1005 starts re-attending to the presentation of the TV programme, the cell processor 100 is operable to initiate reproduction of the stored TV programme data from the point at which the user 1005 stopped attending, whilst still recording TV programme data relating to current broadcast content using known time-shifting techniques common to PVRs. Therefore, a user can continue to watch the entire TV programme to the end even though they may not have been attending to the presentation of the TV programme at some point during the broadcast of the TV programme.

An embodiment of the present invention in which the video camera 756 is used to monitor whether a user is attending to a presentation of media data stored on a storage means such as a DVD-ROM or Blu-ray ROM by a media presentation means such as the display and sound output device 300 of will now be described with reference to FIGS. 10 to 13. In the embodiments described below, the media data is a movie and the storage medium is a Blu-ray disc. However, it will be appreciated that other media data such as audio data and other storage media such as DVD-ROM, CD-ROM, CD and the like may be used.

Figure 10:
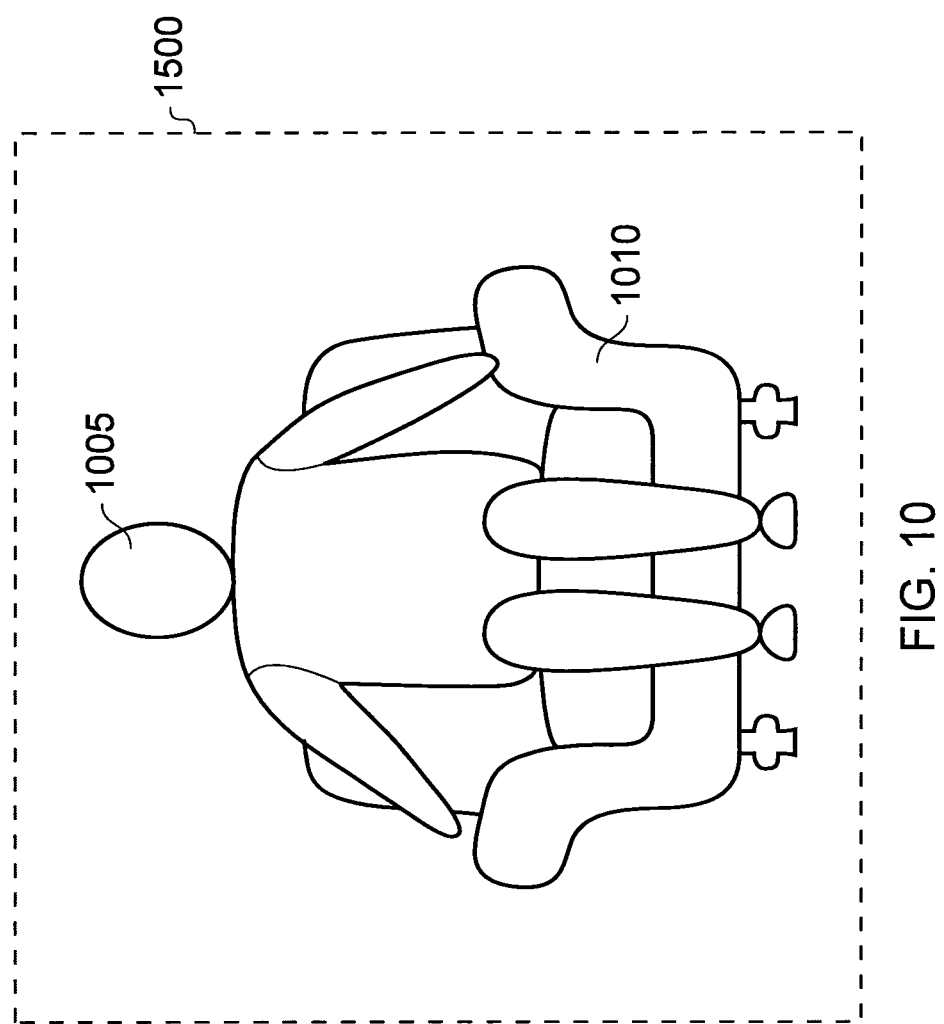
FIG. 10 is a schematic illustration of a monitoring area within a field of view of a video camera of an audio visual entertainment system in accordance with an embodiment of the present invention.

FIG. 10 is a schematic diagram of a monitoring area within a field of view of a video camera in accordance with an embodiment of the present invention. FIG. 10 shows the user 1005 sitting in the chair 1010 within the field of view of the video camera 756. A watch frame 1500 is used to monitor whether the user is attending to the presentation of the media data. In other words, the watch frame acts as an image monitor area.

Figure 11:
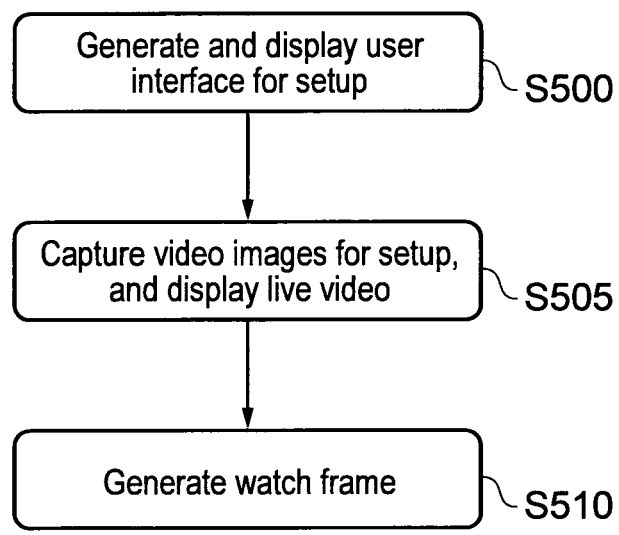
FIG. 11 is a flow diagram of a set up process for configuring a monitoring area within a field of view of a video camera of an audio visual entertainment system using a method in accordance with an embodiment of the present invention.

A way in which the audio visual entertainment system 1000 is set up so as to detect whether the user 1005 is attending to the presentation of the media data will now be described with reference to FIG. 11.

In an embodiment of the present invention, the cell processor 100 is operable, at a step s500, to generate a user interface, and display the user interface to the user 1005 on the display and sound output device 300 so as to allow the user to select a playback option related to playback and presentation of the media data stored on the storage medium.

At a step s505, a live video feed of the video images captured by the video camera 756 is presented to the user 1005 on the display and sound output device 300. The user 1005 then positions the video camera 756 so that it captures images of the room such that a field of view of the video camera 756 encompasses a position within the room from which the user 1005 is likely to view the presentation of the movie.

Then, at a step s510, the watch frame 1500 is generated. In an embodiment, the user may use the game controller 751 to define the boundaries of the watch frame 1500. The watch frame 1500 is a rectangular image area that encompasses the user's viewing position within the room although other watch frame shapes could be used. It will be appreciated that, if there are several users, then several watch frames could be defined. Alternatively, the watch frame 1500 can be set by the user to encompass the viewing positions of all the users.

In another embodiment, the cell processor 100 can automatically generate the watch frame 1500 by analysing the received video images. A calibration screen is presented to the user 1005 instructing the user or users to wave at the video camera 756. The cell processor 100 carries out known motion detection techniques on the captured video images to detect areas of motion within the captured images. The cell processor 100 then designates each localised area of movement as corresponding to a user and defines the watch frame about the centre of mass of the localised areas of movement. For example, the watch frame 1500 could be centred on the centre of mass of the localised areas of movement and defined so as encompass 50 percent of the field of view of the video camera 756. However, it will be appreciated that other suitable methods of defining the watch frame could be used.

In the embodiment where the watch frame 1500 is defined by the user 1005, the cell processor 100 detects the number of users within the watch frame by counting the number of discrete areas of movement detected when the users were waving at the video camera 756. This data can then be used when detecting whether one or more of the users are attending to the presentation of the movie.

Figure 12:
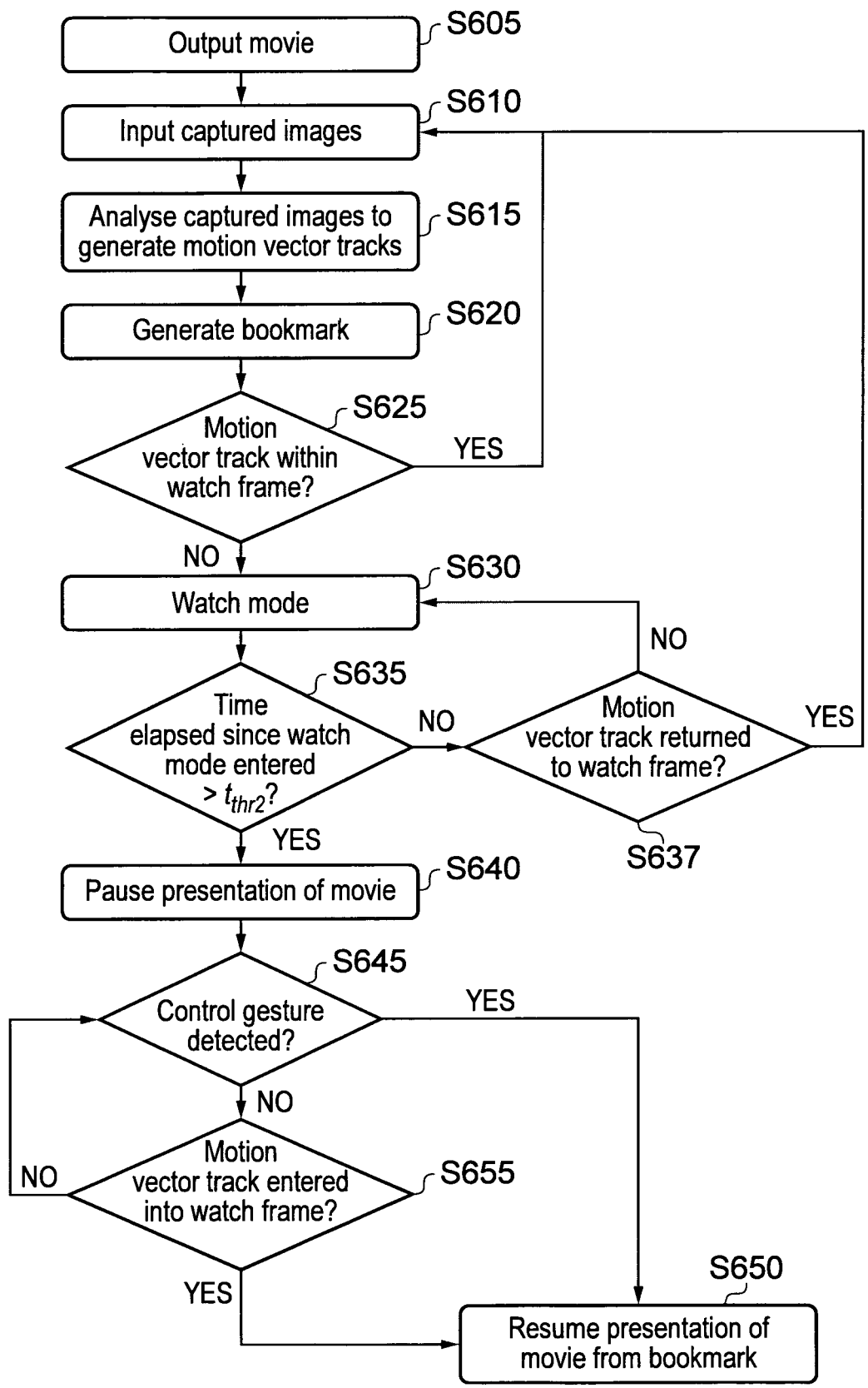
FIG. 12 is a flow diagram of a method, in accordance with an embodiment of the present invention, for controlling the presentation of media data by an audio visual entertainment system.

A method of controlling the presentation of media data using the audio visual entertainment system 1000 will now be described with reference to FIG. 12 and FIG. 13. FIG. 12 is a flow diagram illustrating the method, and FIG. 13 is a schematic illustration of positions of different motion vector tracks with respect to the watch frame 1500.

Figure 13:
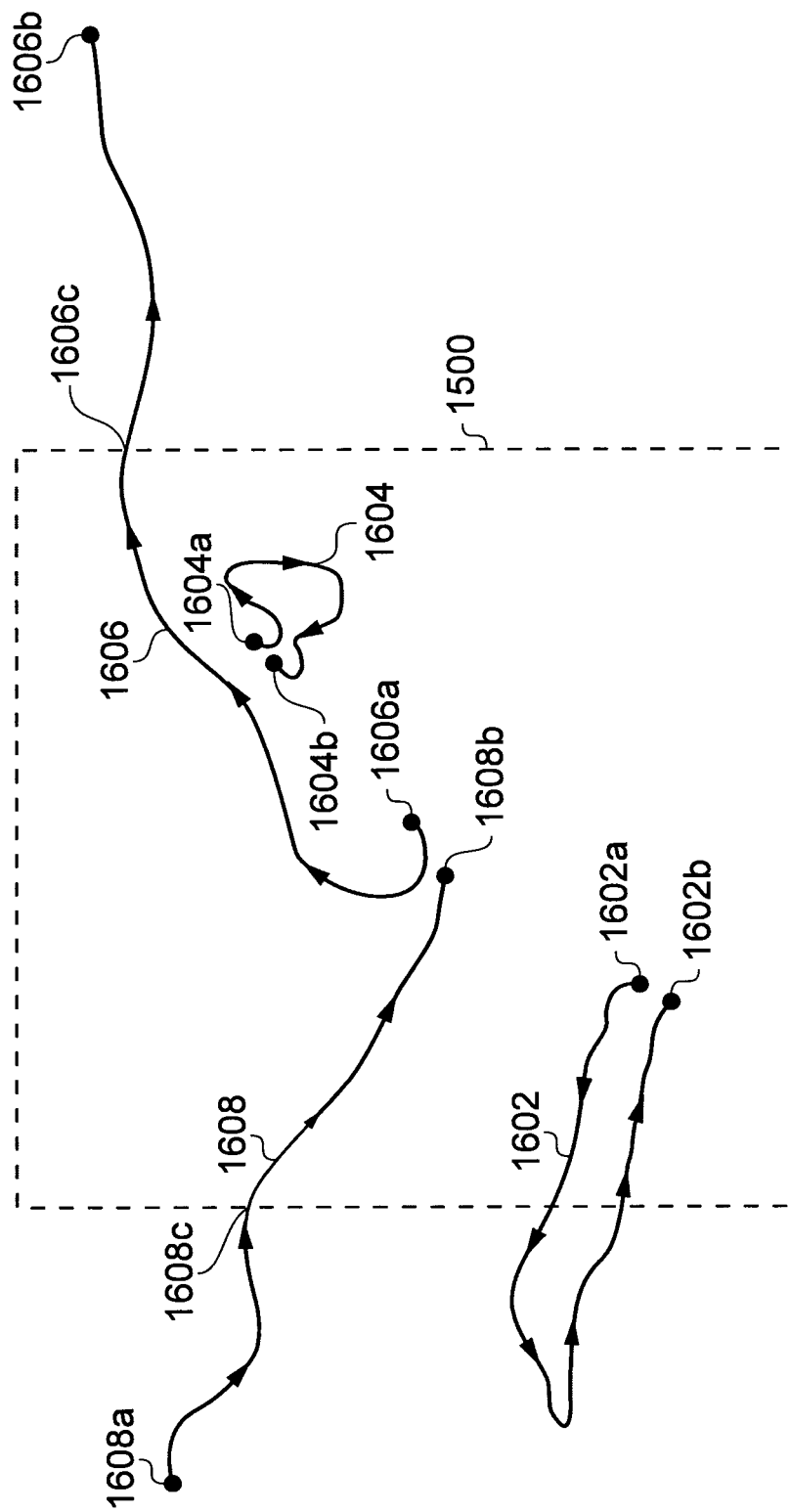
FIG. 13 is a schematic illustration of positions of different tracked motion vectors with respect to a monitoring area in accordance with an embodiment of the present invention.

FIG. 13 shows an example of different motion vector tracks with respect to the watch frame 1500. The relationship between the motion vector tracks and the watch frame 1500 is used to determine whether the user 1005 is attending to the presentation of the movie. The motion vector tracks illustrated in FIG. 13 are: motion vector track 1602 having a start point 1602a and an end point 1602b; motion vector track 1604 having a start point 1604a and an end point 1604b; motion vector track 1606 having a start point 1606a and an end point 1606b; and motion vector track 1608 having a start point 1608a and an end point 1604b. The way in which motion vector tracks are generated and their interaction with the watch frame 1500 will be described in more detail below.

Referring now to FIG. 12, at a step s605, the cell processor 100 is operable to cause the movie stored on the Blu-ray® disc to be presented to the user 1500 on the display and sound output device 300.

During presentation of the movie, the images captured by the video camera 756 are input, at a step s610, to the cell processor 100. At a step s615, the cell processor 100 analyses the captured video images received from the video camera 756 to detect movement within the field of view of the video camera so as to generate motion vector tracks that correspond to movement of the objects.

To generate the motion vector tracks, the cell processor 100 generates motion vectors in dependence upon pixel differences between successive video images using known techniques. Each motion vector typically corresponds to motion of part of the image.

In an embodiment, motion vectors are generated from areas of the captured image that exhibit a change with respect to a previous frame and whose image area is greater than a predetermined threshold. Typically, once the watch frame 1500 has been defined, the predetermined threshold for the image area is set by the cell processor 100 to correspond to a typical size of a user's body. This advantageously reduces the likelihood that motion vectors will be generated corresponding, for example, to a user's hand which may leave the watch frame 1500 during some excited gesticulation even if the user's torso has not left the watch frame 1500. However, it will be appreciated that motion vectors may be generated from other image features that exhibit intra-frame motion corresponding to the user.

The cell processor 100 then generates the motion vector tracks by using known techniques such as Kalman filtering to link motion vectors that correspond to continuous movement of an image area over a series of images. Therefore, even if a series of motion vectors do not appear to be continuous throughout a sequence of images, motion vectors can be associated with a motion vector track and the continuity of the motion vector track maintained. The motion vector track is continuously updated each frame so as to maintain a track of an object within the captured video images.

Typically, Blu-ray discs, DVD-ROMs, CDs and the like comprise time code data that relates to timing and playback of the media data. Therefore, when motion is detected as indicated by the generation motion vector, the cell processor 100 generates, at a step s620, a bookmark in dependence upon the Blu-ray disc's time code data. A bookmark indicates a point from which presentation of the movie should resume if it is later determined that a user is not attending to the presentation of the movie. In an embodiment, each detected motion vector track is associated with a respective bookmark, and each bookmark is stored as bookmark data to the XDRAM 500 or the HDD 400.

However, this may give rise to a potentially large number of bookmarks. Therefore, in an embodiment, only those bookmarks which are associated with motion vectors that are linked to form motion vector tracks whose length, as measured along the path of the motion vector track, is greater than a predetermined threshold are retained. Bookmarks associated with motion vectors whose motion vector tracks are smaller than the predetermined threshold are deleted.

Another method of reducing the number of bookmarks is to delete any bookmarks associated with a motion vector track that has not left the watch frame 1500 within a predetermined time period $t_{thr1}$. In this case, the user 1005 is likely to still be attending to presentation of the movie and so the bookmark unlikely to be needed. Optionally, the motion vector track is deleted together with the corresponding bookmark after expiry of the predetermined time period $t_{thr1}$. However, it will be appreciated that the methods described above for reducing the overall number of number of bookmarks could be combined and that other suitable methods could be used.

At a step s625, the cell processor 100 monitors the motion vector tracks to detect whether they are within the watch frame 1500. If the motion vector tracks are within the watch frame 1500, then presentation of the movie carries on as normal, and processing returns to the step s610.

For the avoidance of doubt, wherever motion vector tracks are referred to as being inside or outside the watch frame 1500, it is to be understood that the position referred to is the pixel coordinate of the motion vector used to update that motion vector track at that time rather than the position of the motion vector track as a whole that is meant.

An example of a motion vector track remaining within the watch frame is illustrated by the motion vector track 1604 in FIG. 13. The start point 1604a corresponds to a image area at which a motion vector was initially generated by the cell processor 100 in dependence upon intra-frame pixel differences. Known motion tracking techniques are then used as described above to generate the motion vector track 1604, which is indicated by the solid line and terminates at the end point 1604b. For example, the motion vector track could correspond to movement of the user's shoulder. However, because the motion vector track 1604 does not leave the watch frame 1500 at any point, the user is likely to be attending to the presentation of the movie and therefore presentation of the movie carries on as normal.

However, if any motion vectors are outside the watch frame 1500, then it is likely that the user corresponding to that motion vector track is no longer attending to the presentation of the movie. Therefore, if any of the motion vector tracks are detected as being outside the watch frame 1500, then the audio visual entertainment system 1000 enters a watch mode at a step s630.

An example of a motion vector track leaving the watch frame 1500 is illustrated by the motion vector track 1606 in FIG. 13. For example, the motion vector track 1606 could correspond to the user 1005 getting up from a chair and leaving the room. The start point 1606a of the motion vector track 1606 is associated with a bookmark. The motion vector track 1606 follows the motion of the user 1005 until the motion vector track 1606 leaves the watch frame 1500 at the point 1606c, thus triggering the watch mode. The motion vector track 1606 ends at the end point 1606b corresponding, for example, to the user 1005 leaving the room.

The watch mode allows the cell processor 100 to monitor further activity of the user and detect whether the presentation of the movie should be paused. On initiation of the watch mode at the step s630, the cell processor 100 starts a timer that indicates the time elapsed since the motion vector track left the watch frame 1500 (i.e. time elapsed since the watch mode was entered). Then, at a step s635, the cell processor 100 detects whether the time elapsed since the watch mode was entered is greater than a predetermined time period $t_{thr2}$.

If the time elapsed is not greater than the threshold $t_{thr2}$, then, at a step s637, the cell processor 100 detects whether the motion vector track that left the watch frame 1500 has returned to the watch frame 1500. If the motion vector track has returned to the watch frame 1500, it is likely that the user 1005 left the watch frame only temporarily and that they were still attending to the presentation of the movie. In this case, processing returns to the step s610.

An example of a motion vector track temporarily leaving the watch frame 1500 is illustrated by the motion vector track 1602 in FIG. 13. For example, the user 1005 may have got up from a chair to fetch an object from a table in the room and then sat back down in the chair. The user is likely to have been attending to the presentation of the movie whilst fetching the object from the table and therefore presentation of the movie can carry on as before. In this case, the start point 1602a and end point 1602b of the motion vector track 1602 are in similar positions within the watch frame because the user 1005 is likely to adopt a similar sitting position when returning to the chair as when they left the chair.

If, at the step s637, the cell processor 100 detects that the motion vector track has not returned to the watch frame 1500, then processing returns to the watch mode at the step s630.

If the motion vector remains outside the watch frame 1500 for longer than the predetermined time period $t_{thr2}$, then, at a step s640, the cell processor 100 is operable to pause presentation of the movie. A graphical user interface watch control panel generated by the cell processor 100 is then displayed on the display and sound output device 300 or overlaid on the presentation of the movie. In an embodiment of the present invention, the predetermined time period $t_{thr2}$ is configurable by the user 1005 at the setup screen. Alternatively, the predetermined time period $t_{thr2}$ is preset via software, although it will be appreciated that any suitable method for setting the predetermined time period $t_{thr2}$ may be used. Optionally, it will be appreciated that whenever the watch mode is entered (i.e. when a motion vector track leaves the watch frame), presentation of the movie may be paused.

At a step s645, the cell processor 100 monitors the captured video images received from the video camera 756 so as to allow the user 1005 to control the GUI via gesture control using known gesture recognition techniques.

If the cell processor 100 detects a suitable control gesture, then, at a step s650, the cell processor 100 causes presentation to resume from the time indicated by the bookmark associated with the motion vector track that triggered the watch mode.

In an embodiment, a user can use gesture control (e.g. waving) to select between continuing presentation of the movie from the point at which presentation was paused and to restart presentation of the movie from the time indicated by the bookmark associated with the motion vector track that triggered the watch mode. However, it will be appreciated that other suitable control gestures or user inputs via the game controller 751 or other suitable input device may be used to control the audio visual entertainment system 1000.

For example, if a second viewer who was viewing the presentation of the movie leaves the room and does not intend to return, then the user 1005 can use a suitable gesture such as a wave to cause the cell processor 100 to continue playback from the point at which the presentation of the movie was paused. Alternatively, for example, if the second viewer left the room to make a drink and then returns to view the presentation, the cell processor 100 can resume playback of the movie from the bookmark (associated with a time at which the second user left to make the drink) in response to a suitable gesture from the user 1005.

If no gesture is detected then, at a step s655, the cell processor 100 monitors the received captured video images to detect motion vector tracks as described above. If a motion vector track is detected that enters the watch frame 1500 and then becomes substantially stationary, the cell processor 100 is operable to cause the audio visual entertainment system 100 to resume presentation of the movie at the step s650 from the time indicated by the stored bookmark data.

An example of a motion vector track entering the watch frame 1500 and becoming substantially stationary is illustrated by the motion vector track 1608 in FIG. 13. For example, the user 1005 may enter the room having made a drink and their motion whilst entering the room giving rise to the start point 1608a of the motion vector track 1608. The user 1005 then moves toward a chair within the watch frame 1500 and, in so doing, enters the watch frame at the point 1608c. The user 1005 then sits in the chair and the motion vector track becomes substantially stationary and terminates at the end point 1608b. Presentation of the movie then resumes from the time indicated by stored bookmark data.

If no motion vector tracks enter the watch frame, then the movie remains paused and processing returns to the step s645. In an embodiment, if, within a predetermined time period, the cell processor 100 does not detect a control gesture or detect a motion vector track which enters the watch frame 1500 (at the step s645 or at the step s655 respectively), then the cell processor 100 is operable to cause the audio visual entertainment system to shut down or enter a stand-by mode.

In an embodiment of the invention, the cell processor 100 is operable to detect the number of viewers within the watch frame as described above. Accordingly, the cell processor 100 maintains a record of a number of motion vector tracks leaving the watch frame 1500 and generates a corresponding bookmark for each motion vector track that is detected as having left the watch frame 1500. After entering the watch mode, presentation of the movie resumes from the bookmark having the earliest time stamp. Alternatively, the user 1005 or users may select from which bookmark they wish presentation to resume by using the watch mode option GUI. In this embodiment, the system 100 need not uniquely identify each bookmark with the associated motion vector track; all that is required is data regarding the number of users in the watch frame 1500 and the number of users that have left the watch frame 1500. If all the users are detected as having left the watch frame 1500, and none of the users return to the watch frame within a predetermined period of time, the cell processor is operable to cause the system 1000 to shut down or enter a stand-by mode.

As an example of the operation of the above described system, the following scenario is described so as to illustrate the advantages of the described embodiments. For example, a husband and wife are watching a movie stored on a Blu-ray disc using the audio visual entertainment system 1000 in accordance with embodiments of the present invention. A door bell rings, and the husband gets up and leaves the room to answer the door. The cell processor 100 detects that the husband has left the watch frame 1500 as described above and causes the system 1000 to generate a bookmark, enter the watch mode and accordingly pause playback of the movie. A person at the door wishes to speak with the wife so the wife's husband calls her. The wife then leaves the watch frame 1500 to speak to the person at the door. The husband returns to the watch frame and his wife later returns once she has finished speaking with the person at the door. The cell processor 100 then causes playback of the movie to resume from the point at which the husband left the watch frame 1500 as indicated by the associated bookmark. Therefore, the husband and wife can resume watching the movie without having to use a remote control to manually rewind the movie to a point at which the husband left to answer the door.

It will be appreciated that the face detection techniques described above with reference to FIGS. 5 to 9 may be applied alone or in combination with the motion vector detection and tracking described above to provide the functionality of the embodiments described with reference to FIGS. 10 to 13. Additionally, it will be appreciated that the motion vector technique described with reference to FIGS. 10 to 13 may be applied alone or in combination with the face detection described above to provide the functionality of the embodiments described with reference to FIG. 5 to 9.

It will be appreciated that in embodiments of the present invention, elements of the method may be implemented in the entertainment device in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. A media recorder operable to receive broadcast media data from a media data source, the media recorder comprising:
    a storage element operable to store at least a portion of the broadcast media data received from the media data source;
    a receiver operable to receive a sequence of video images from a video camera via a communications link;
    a user detector operable to detect, by analysis of the sequence of video images received from the video camera via the communications link, whether a user is attending to a presentation of the media data by a media data presentation unit; and
    a media presentation status detector operable to detect whether the presentation of the media item has ended, in which:
    when the user detector detects that the user is not attending to the presentation of the media data, the user detector is operable to cause the storage element to store the media data received from the media data source; and
    when the media presentation status detector detects that presentation of the media item has ended, the media presentation status detector is operable to cause the media recorder to enter a stand-by mode;
    wherein the user detector is operable to detect whether the user is attending to the presentation of the media data by carrying out face detection on the sequence of video images to determine whether the user is present within a field of view of the video camera, the face detection being carried out either on a part of the sequence of video images that is most likely to correspond to a position of the user's head or on a previously defined image area which has been defined by the user.

2. A media recorder according to claim 1, in which, if a face is detected within a field of view of the video camera, the user detector is operable to:
    detect whether the user's eyes are open or shut; and
    cause the storage element to store the media data received from the media data source if the user's eyes are detected as being shut.

3. A media recorder according to claim 2, in which the user detector is operable to:
    detect a number of images of the sequence of video images during which the user's eyes have been shut; and
    cause the storage element to store the media data received from the media data source if the number of images during which the user's eyes have been shut is greater than a first predetermined threshold number of images.

4. A media recorder according to claim 1, in which the user detector is operable to cause the storage element to store the media data received from the media data source if a face is not detected within the field of view of the video camera.

5. A media recorder according to claim 4, in which the user detector is operable to:
    detect a number of images of the sequence of video images for which a face has not been detected; and
    cause the storage element to store the media data received from the media data source if the number of images for which no face has been detected is greater than a second predetermined threshold number of images.

6. A media recorder according to claim 1, in which the user detector is operable to cause the storage element to store the media data received from the media data source when the user detector detects that a user is not attending to the presentation of the media data.

7. A media recorder according to claim 6, in which the user detector is operable to:
    detect whether the user has returned to the presentation of the media data; and
    cause the storage element to stop storing the media data if the user detector detects that the user has returned to the presentation of the media data.

8. A media recorder according to claim 7, in which the user detector is operable to cause the storage element to stop storing the media data if the user detector detects that, having returned to the presentation of the media data, the user has been attending to the presentation of the media data for greater than a pre-determined threshold number of video images received from the video camera.

9. A media recorder according to claim 6, in which:
    the storage element comprises a media data temporary storage area and a media data permanent storage area, the temporary storage area being operable to continuously store the broadcast media data in a circular buffer; and
    the user detector is operable to cause the storage element to store the media data in the circular buffer to the media data permanent storage area if the user detector detects that the user is not attending to the presentation of the media data.

10. A media recorder according to claim 6, in which:
    the storage element is operable to continuously store the broadcast media data in a circular buffer; and
    if the user detector detects that the user is not attending to the presentation of the media data, the storage element is operable not to overwrite the media data stored in the circular buffer from a point at which it was detected that the user was not attending to the presentation of the media data.

11. A media recorder according to claim 1, in which:

the storage element is operable to store the received broadcast media data to the storage element; and whilst storing the received broadcast media data to the storage element, the media recorder is operable to output media data stored in the storage element to the media data presentation unit.

12. An audio-visual entertainment system, comprising:

a broadcast media data receiver operable to receive broadcast media data from a media data source;

a media data output source operable to present the received broadcast media data to a user; and a media recorder comprising:

a storage element operable to store at least a portion of the broadcast media data received from the media data source;

a receiver operable to receive a sequence of video images from a video camera via a communications link;

a user detector operable to detect, by analysis of the sequence of video images received from the video camera via the communications link, whether a user is attending to a presentation of the media data by a media data presentation unit; and a media presentation status detector operable to detect whether the presentation of the media item has ended, in which:

when the user detector detects that the user is not attending to the presentation of the media data, the user detector is operable to cause the storage element to store the media data received from the media data source; and when the media presentation status detector detects that presentation of the media item has ended, the media presentation status detector is operable to cause the media recorder to enter a stand-by mode;

wherein the user detector is operable to detect whether the user is attending to the presentation of the media data by carrying out face detection on the sequence of video images to determine whether the user is present within a field of view of the video camera, the face detection being carried out either on a part of the sequence of video images that is most likely to correspond to a position of the user's head or on a previously defined image area which has been defined by the user.

13. A method for storing broadcast media data received from a media data source using a media recorder operable to receive the broadcast media data from the media data source and having a storage element operable to store at least a portion of the broadcast media data received from the media data source, the method comprising:

receiving a sequence of video images from a video camera via a communications link;

detecting, by analysis of the sequence of video images received from the video camera via the communications link, whether a user is attending to a presentation of the media data by a media data output source;

storing the media data received from the media data source to the storage element if the detection of whether the user is attending to the presentation of the media data detects that the user is not attending to the presentation of the media data;

detecting whether the presentation of the media item has ended; and causing the media recorder to enter a stand-by mode if it is detected that presentation of the media item has ended;

wherein detecting whether the user is attending to the presentation of the media data is done by carrying out face detection on the sequence of video images to determine whether the user is present within a field of view of the video camera, the face detection being carried out either on a part of the sequence of video images that is most likely to correspond to a position of the user's head or on a previously defined image area which has been defined by the user.

14. A tangible, non-transitory computer-readable storage medium on which computer readable instructions of a computer program are stored, the instructions, when executed by a computer, cause the computer to operate as media recorder having:

a storage element operable to store at least a portion of broadcast media data received from a media data source;

a receiver operable to receive a sequence of video images from a video camera via a communications link;

a user detector operable to detect, by analysis of the sequence of video images received from the video camera via the communications link, whether a user is attending to a presentation of the media data by a media data presentation unit; and a media presentation status detector operable to detect whether the presentation of the media item has ended, in which:

when the user detector detects that the user is not attending to the presentation of the media data, the user detector is operable to cause the storage element to store the media data received from the media data source; and when the media presentation status detector detects that presentation of the media item has ended, the media presentation status detector is operable to cause the media recorder to enter a stand-by mode;

wherein the user detector is operable to detect whether the user is attending to the presentation of the media data by carrying out face detection on the sequence of video images to determine whether the user is present within a field of view of the video camera, the face detection being carried out either on a part of the sequence of video images that is most likely to correspond to a position of the user's head or on a previously defined image area which has been defined by the user.

15. A tangible, non-transitory computer-readable storage medium on which computer readable instructions are stored, the instructions, when executed by a computer, cause the computer to carry out a method for storing broadcast media data received from a media data source using a media recorder operable to receive the broadcast media data from the media data source and having a storage element operable to store at least a portion of the broadcast media data received from the media data source, the method comprising:

receiving a sequence of video images from a video camera via a communications link;

detecting, by analysis of the sequence of video images received from the video camera via the communications link, whether a user is attending to a presentation of the media data by a media data output source;

storing the media data received from the media data source to the storage element if the detection of whether the user is attending to the presentation of the media data detects that the user is not attending to the presentation of the media data;

detecting whether the presentation of the media item has ended; and causing the media recorder to enter a stand-by mode if it is detected that presentation of the media item has ended;

wherein detecting whether the user is attending to the presentation of the media data is done by carrying out face detection on the sequence of video images to determine whether the user is present within a field of view of the video camera, the face detection being carried out either on a part of the sequence of video images that is most likely to correspond to a position of the user's head or on a previously defined image area which has been defined by the user.

* * * * *